(12) United States Patent
Lin et al.

(10) Patent No.: US 9,846,840 B1
(45) Date of Patent: Dec. 19, 2017

(54) SEMANTIC CLASS LOCALIZATION IN IMAGES

(71) Applicant: Adobe Systems Incorporated, San Jose, CA (US)

(72) Inventors: Zhe Lin, Fremont, CA (US); Xiaohui Shen, San Jose, CA (US); Jonathan W. Brandt, Santa Cruz, CA (US); Jianming Zhang, Newton, MA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/164,310

(22) Filed: May 25, 2016

(51) Int. Cl.
*G06N 3/08* (2006.01)
*G06F 17/30* (2006.01)

(52) U.S. Cl.
CPC ....... *G06N 3/084* (2013.01); *G06F 17/30277* (2013.01)

(58) Field of Classification Search
None
See application file for complete search history.

(56) References Cited

U.S. PATENT DOCUMENTS

| | | | | |
|---|---|---|---|---|
| 8,180,754 B1* | 5/2012 | Ershov | ............................ | 707/706 |
| 8,300,935 B2* | 10/2012 | Distante | ............. | A63B 24/0021 382/103 |
| 8,725,493 B2* | 5/2014 | Womack | ............... | G06F 17/271 704/1 |
| 9,330,334 B2* | 5/2016 | Lin | ....................... | G06K 9/4671 |
| 2010/0040285 A1* | 2/2010 | Csurka | ............... | G06K 9/00624 382/170 |
| 2011/0184950 A1* | 7/2011 | Skaff | ................. | G06F 17/30265 707/737 |
| 2015/0026101 A1* | 1/2015 | Lin | .................... | G06F 17/30247 706/12 |
| 2015/0117784 A1* | 4/2015 | Lin | ...................... | G06K 9/4671 382/195 |
| 2016/0140408 A1* | 5/2016 | Shen | .................... | G06K 9/4676 382/157 |

OTHER PUBLICATIONS

Bency et al., "Weakly Supervised Localization Using Deep Feature Maps", Mar. 29, 2016, pp. 1-20.*
Jia et al., "Caffe: Convolutional Architecture for Fast Feature Embedding", Jun. 20, 2014, pp. 1-4.*
(Continued)

*Primary Examiner* — Paulinho E Smith
(74) *Attorney, Agent, or Firm* — Wolfe-SBMC

(57) ABSTRACT

Semantic class localization techniques and systems are described. In one or more implementation, a technique is employed to back communicate relevancies of aggregations back through layers of a neural network. Through use of these relevancies, activation relevancy maps are created that describe relevancy of portions of the image to the classification of the image as corresponding to a semantic class. In this way, the semantic class is localized to portions of the image. This may be performed through communication of positive and not negative relevancies, use of contrastive attention maps to different between semantic classes and even within a same semantic class through use of a self-contrastive technique.

22 Claims, 14 Drawing Sheets

(56) References Cited

OTHER PUBLICATIONS

Sermanet et al., "OverFeat: Integrated Recognition, Localization and Detection using Convolutional Networks", Feb. 24, 2014, pp. 1-16.*

Simonyan, et al. "Deep Inside Convolutional Networks: Visualizing Image Classification Models and Saliency Maps", In: International Conference on Learning Representations, Workshop., Apr. 19, 2014, 8 pages.

Zeiler, et al. "Visualizing and Understanding Convolutional Networks", In: European Conference on Computer Vision. Springer (2014), Oct. 2014, pp. 818-833.

* cited by examiner

SEMANTIC CLASS LOCALIZATION IN IMAGES

BACKGROUND

Localization refers to an ability to identify a location within an image that is associated with a semantic class, e.g., a particular object, exhibits a feeling such as "happiness," and so forth. Localization is used to support a variety of image functionality, such as semantic tagging, hole filling, artifact removal, image search, captioning, segmentation, object detection, and so forth. For example, localization may be used to disambiguate visual semantics in an image search, e.g., to differentiate a firetruck from a truck fire. Accordingly, accuracy of localization also promotes accuracy in the implementation of this image functionality.

Although localization may be readily performed by humans, this is a particularly challenging problem for computing devices to perform without assistance from humans, at least in part. Accordingly, an inability of computing devices to accurately perform localization may also inhibit an ability of the computing devices to support the variety of image functionality described above. Conventional techniques to do so, however, are often inaccurate or require human assistance.

Conventionally, machine learning techniques may be used to train a model to identify whether an object is or is not included in an image. However, in order to determine where the object is located in the image in conventional machine learning techniques, training data is required that includes bounding boxes describing the location. In order to generate these bounding boxes, conventional techniques rely on users to manually draw a boundary of the bounding boxes, which is expensive, inefficient, and oftentimes inaccurate. For example, manually drawn bounding boxes typically include portions of the image that do not include an object being localized and thus may result in inaccuracies in training a model. Further, thousands of training images are typically employed to train even a single model. These limitations limit availability of localization and thus availability to support other image functionality.

SUMMARY

Semantic class localization techniques and systems are described. In one or more implementations, machine learning techniques are employed to both classify an image as including an object and also where the object is located within the image, i.e., localization. To do so, the machine learning techniques learn patterns of neurons by progressing through layers of a neural network. The patterns of the neurons are used to identify existence of a semantic class within an image, such as an object, feeling, and so on as described previously. As part of this, relevancies of the neurons to the semantic class are also communicated back through layers of a neural network. Through use of these relevancies, activation relevancy maps are created that describe relevancy of portions of the image associated with neurons of the neural network to the semantic class. In this way, the semantic class is localized to portions of the image. To do so, positive and not negative relevancies are communicated through the neural network. For example, communication of positive relevancies describes portions of the image that are relevant to the semantic class, whereas negative relevancies do not. Accordingly, this may be used to increase efficiency in the neural network to localize the semantic class.

Contrastive attention maps may also be employed to differentiate between semantic classes. For example, contrastive attention maps may be used to differentiate between different objects within an image to localize the objects. In this way, the contrastive attention maps may help to differentiate portions of the image that are relevant to the semantic class from portions that are relevant to other semantic classes. Contrastive attention maps may also be used within a same semantic class through use of a self-contrastive technique, such as to differentiate between parts of the image that include an object and parts that do not include the object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
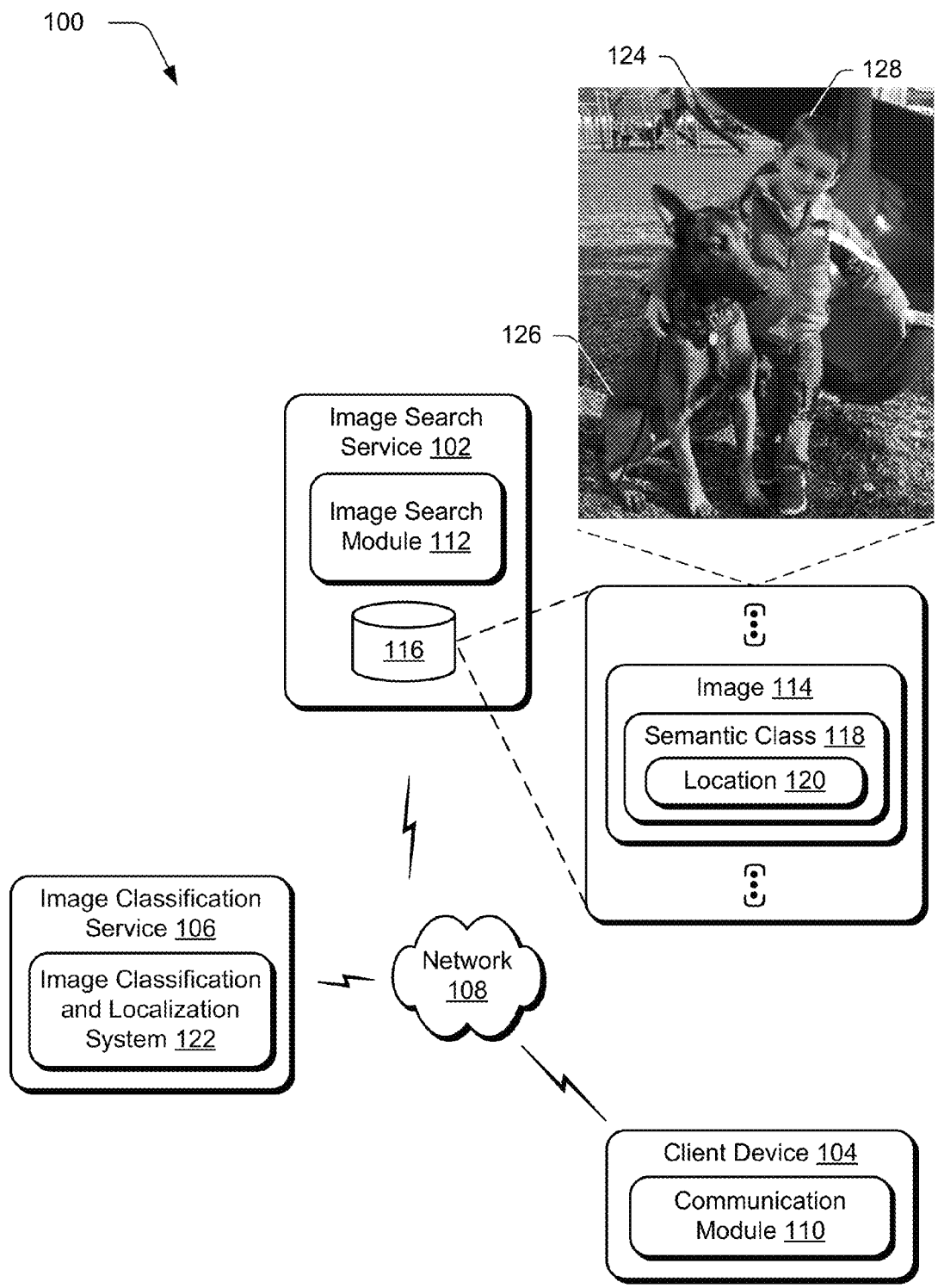
FIG. 1 is an illustration of an environment in an example implementation that is operable to employ semantic class localization techniques described herein.

Conventional localization techniques rely on manual inputs from users in order to train a model as part of machine learning. Accordingly, these conventional techniques are limited by accuracy of a user in providing the inputs, by expense of obtaining these inputs from the user, by availability of semantic classes (e.g., objects) that have been trained due to this expense, and so on.

Semantic class localization techniques and systems for images are described. Semantic classes refer to the "what" is being portrayed in an image, such as an object that is shown at the location (e.g., a tree), an emotion exhibited at the location (e.g., happy), and so forth. Localization refers to a location within the image that corresponds to the semantic class, e.g., a location in the image that includes the tree, is considered "happy", and so forth.

Accordingly, a combination of identification of a semantic class and localization of the semantic class may give insight into what is actually being portrayed in the image and thus may support rich and accurate image processing techniques. For an image search, for instance, the classification of an image into semantic classes (e.g., "what" is contained in the image) and the localization of the semantic classes within the image (e.g., "where" the semantic class is located within the image) provide insight into understanding the image. This combination of classification and localization, for instance, may be used to disambiguate images that use similar semantic classes. For example, the localization of semantic classes can be used to differentiate one image having a dog and a man from another image having a dog-like man.

To do so, machine learning techniques are used to train a model for use in classifying an image, as corresponding to a particular semantic class, and in localizing the semantic class within the image. Further, the machine learning techniques that are described in the following may do so without reliance on manual inputs from users. The model, for instance, may be trained in a manner that is weakly supervised, e.g., through use captions that act as tags that generally describe which semantic classes are included in the image as a whole.

Machine learning may be performed in a variety of ways, such as through use of a neural network that includes a plurality of layers. Each of the plurality of layers includes a plurality of neurons that are used as part of classification. Neurons are implemented by a computing device as a mathematical approximation of a biological neuron that accept a vector of inputs, performs transformation on the inputs, and outputs a scalar value. In order to classify an image as corresponding to a particular semantic class, for instance, the techniques involve learning patterns of neurons through successive layers of the neural network. These patterns, once learned, are then usable to determine whether subsequent images include or do not include semantic classes that corresponds to the patterns. In other words, the patterns are used to define the "what" is included in the image through classification into a corresponding semantic class.

In one example, patterns are aggregated for successively larger portions of the image by progressing through the layers in order to determine "what" (i.e., the semantic class) is represented in these portions, e.g., in a "bottom-up" direction through the layers. The portions, for example, may progress from neurons that represent textures in one layer, to ever increasingly larger portions of objects through successive layers. For instance, a plurality of neurons that represent textures in one layer may be aggregated to describe a portion of an object formed from those textures in another layer. In this way, patterns are aggregated through these increasingly larger portions to classify the image as corresponding to a semantic class. Thus, progression through this sequence of layers may be used to further refine the "what" is being represented at each layer in order to determine a semantic class that corresponds to the image.

In order to localize this classification of the particular semantic class within the image, relevancy of the neurons to the semantic class (e.g., object) is also communicated backwards through the sequence that is used to aggregate the patterns as described above. This process is also referred to as a "back propagation" technique. For example, activation relevancy maps may be used to define relevancy of neurons at respective layers of the neural network to the semantic class. By communicating these relevancies backwards through the sequence of layers, locations within the image (as corresponding to respective nodes in the neural network) may be further refined for increasingly smaller portions of the image as being relevant to the semantic class. In this way, the semantic class is localized to a particular location within the image as part of these increasingly smaller portions.

A variety of functionality may be employed as part of communication of relevancy in order to improve localization accuracy. In one example, a "winner take all" probabilistic approach is used to propagate positive relevancy backwards through the sequence of layers, i.e., indications that respective neurons are relevant to semantic class. In this example, negative relevancy is not considered informative of localization and thus is not back propagated. A neuron in one layer of the neural network, for instance, may be connected to a plurality of neurons in another layer. In other words, the plurality of neurons is considered children of the neuron when progressing backward through the sequence, i.e., one to many. This relationship is also used to aggregate patterns of neurons when progressing forward through the sequence (i.e., many to one). When progressing backwards through the sequence, probabilities of relevancy of the child neurons to the semantic class are determined, and positive relevancies are propagated whereas negative relevancies are not. This is because negative relevancies are not indicative of localization. In this way, localization may be determined with increased efficiency by communicating this relevancy back through the sequence of layers that is used to learn the patterns. Additionally, this communication may use a linear function which allows efficient computation of any linear combination of relevancies (e.g., activation relevancy maps as described in the following), thereby promoting computational efficiency. Communication of relevancies may also be configured to preserve a sum of relevance values across layers of the neural network which normalizes the activation relevance maps for comparison. These examples are further described in relation to FIGS. 3-5.

In another example, contrastive activation relevancy maps are also communicated back through the sequence of layers of the neural network to further improve localization accuracy. For example, a contrastive activation relevancy map may be used to differentiate evidence from one semantic class in relation to another, e.g., dog versus cat. In this way, localization may be performed to support different semantic classes within the same image. In another example, the contrastive activation relevancy map is self-contrastive, such as to differentiate between relevancy to "zebra" and "non-zebra." Accuracy of localization may then be improved for a "zebra" semantic class by removal of neurons that are common to both maps. Further discussion of these and other examples are described in relation to FIGS. 6 and 7.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes an image search service 102, a client device 104, and an image classification service 106 that are communicatively coupled, one to another, via a network 108. The image search service 102, client device 104, and image classification service 106 may be implemented by one or more computing devices.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, the computing device may be implemented as part of a computing system having a plurality of different devices, such as multiple servers utilized by a business to perform operations "over the cloud" as further described in relation to FIG. 14.

The client device 104 is illustrated as including a communication module 110 that is implemented at least partially in hardware to communicate with the image search service 102 via the network 108. The image search service 102 includes an image search module 112 that is implemented at least partially in hardware to perform a search to locate one or more of a plurality of images 114, which are illustrated as stored in storage 116. In order to do so, the image search module 112 receives a search query via text and locates an image 114 having a semantic class 118 that corresponds to the search query. As previously described, semantic classes refer to the "what" is being portrayed in an image, such as an object that is shown at the location (e.g., a boy, a dog), an emotion exhibited at the location (e.g., happy), and so forth. Thus, an image search may be performed for images 114 that include the semantic class 118.

In order to improve accuracy of the search, localization techniques may also be leveraged that provide an increased understand of the "what" of the image. Localization refers to a location within the image that corresponds to the semantic class, e.g., a location in the image that includes a tree, is considered "happy", and so forth. Accordingly, association of a location 120 with the semantic class 118 of the image 114 may provide increased understanding of the image that may be leveraged as part of the search.

For example, a conventional image search that relies solely on a semantic class may return similar image search results for "firetruck" and "fire with truck". However, location 120 information along with the semantic class 118 may disambiguate these searches, e.g., by locating an image that has a semantic class "truck" along with the semantic class "fire" as separated by the localization. Although image search techniques have been described as an example that leverage localization and semantic classes, a variety of other image processing functionality may also employ these techniques, examples of which include semantic tagging, hole filling, artifact removal, captioning, segmentation, object detection, and so forth.

The image classification service 106 is illustrated as including an image classification and localization system 122. This system is implemented at least partially in hardware to classify image 114 as corresponding to a semantic class 118 and a location 120 within the image 114 that supports this correspondence. As shown for image 124, for instance, semantic classes of "dog" and "boy" are localized to respective portions 126, 128 of the image 124 which aides in understanding of "what" is captured by the image 124. Although illustrated separately from the image search service 102, functionality of the image classification and localization system 122 may be combined with the image search service 102, further separated across additional entities, and so forth. An example of operation of the image classification and localization system 122 is further described in the following and shown in a corresponding figure.

Figure 2:
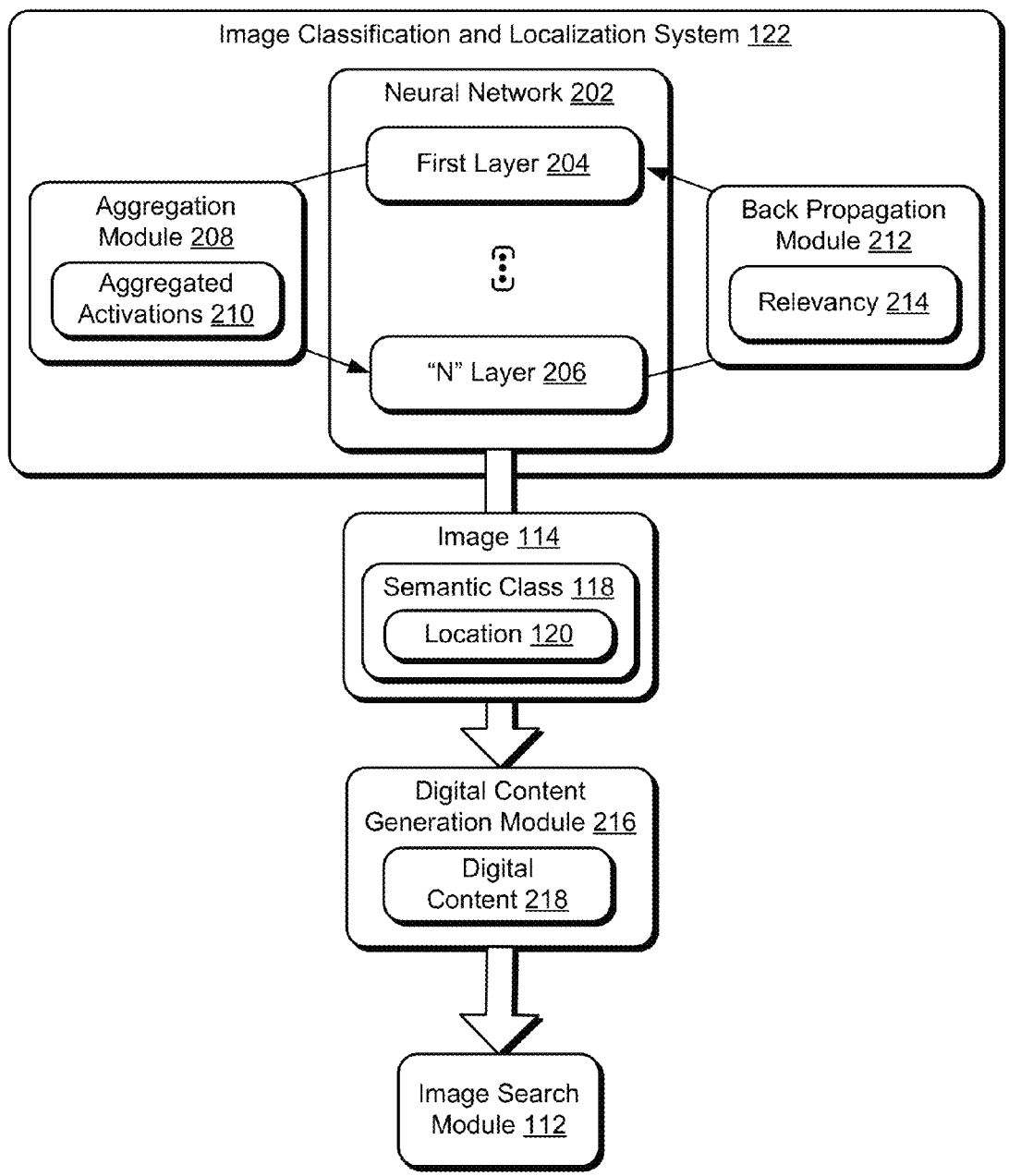
FIG. 2 depicts a system in an example implementation showing an image classification and localization system of FIG. 1 in greater detail.

FIG. 2 depicts a system 200 in an example implementation showing the image classification and localization system 122 in greater detail. The image classification and localization system 122 is implemented in this example using machine learning as performed by a neural network 202 by one or more computing devices. The neural network 202 includes first through "N" layers 204, 206. Each of the layers include neurons that are used to classify the image 114 into a corresponding semantic class 118 and localize the semantic class 118 to a location 120 within the image 114.

In operation, the neural network 202 is first trained as a model to classify and localize semantic classes of images using training images. An advantage of the techniques described herein is that this training may be weakly supervised using training images that are associated with tags. The tags are leveraged to describe "what" is included in the images, even though the tags do not localize the "what" within the images. Accordingly, a vast number of training images are readily available for a vast number of semantic classes. Further, as previously described these training images are not usable for training purposes as part of conventional machine learning techniques. The trained model of the neural network 202 is then employed to classify a subsequent image 114 into a corresponding semantic class 118 and location 120 of the semantic class 118 within the image 114.

An aggregation module 208 is included as part of the image classification and localization system 122 to aggregate activations 210 of neurons as describing patterns within the first through "N" layers 204, 206 to classify the image 114 as associated with the semantic class 118. To do so, the patterns and associated activations are aggregated as progressing through a sequence beginning at the first layer 204 through the "N" layer for progressively larger portions of the image 114. A back propagation module 212 is also included and implemented at least partially in hardware to communicate relevancy 214 of the activation of respective neurons backward through the sequence by progressing from the "N" layer 206 to the first layer 204. A combination of the relevancy 214 and the patterns formed by the aggregated activations 210 are then used to localize the semantic class 118 to a location 120 of the image 114. Further discussion of operation of the neural network 202 is described in relation to FIG. 3 in the following.

The classification of the image 114 as corresponding to a semantic class 118 and location 120 of the semantic class 118 within the image 114 are then communicated to a digital content generation module 216. The digital content generation module 216 is representative of functionality to generate digital content 218 based on the semantic class 118 and location 120. For example, the digital content 218 may be configured to indicate association of the semantic class 118 to the location 120 within the image, e.g., as metadata associated with the image 114, an index usable within a database, and so forth. This metadata and/or index may then be leveraged by the image search module 112 to perform a search using a plurality of similarly configured images. Other examples of digital content 218 include semantic tags assigned to locations (e.g., pixels) within the image, identification of portions of the image 114 that are considered relevant to the semantic class 118, and so forth. As previously described, this digital content 218 may be used to support a variety of addition image processing functionality, such as hole filling, artifact removal, captioning, segmentation, object detection, and so forth.

Figure 3:
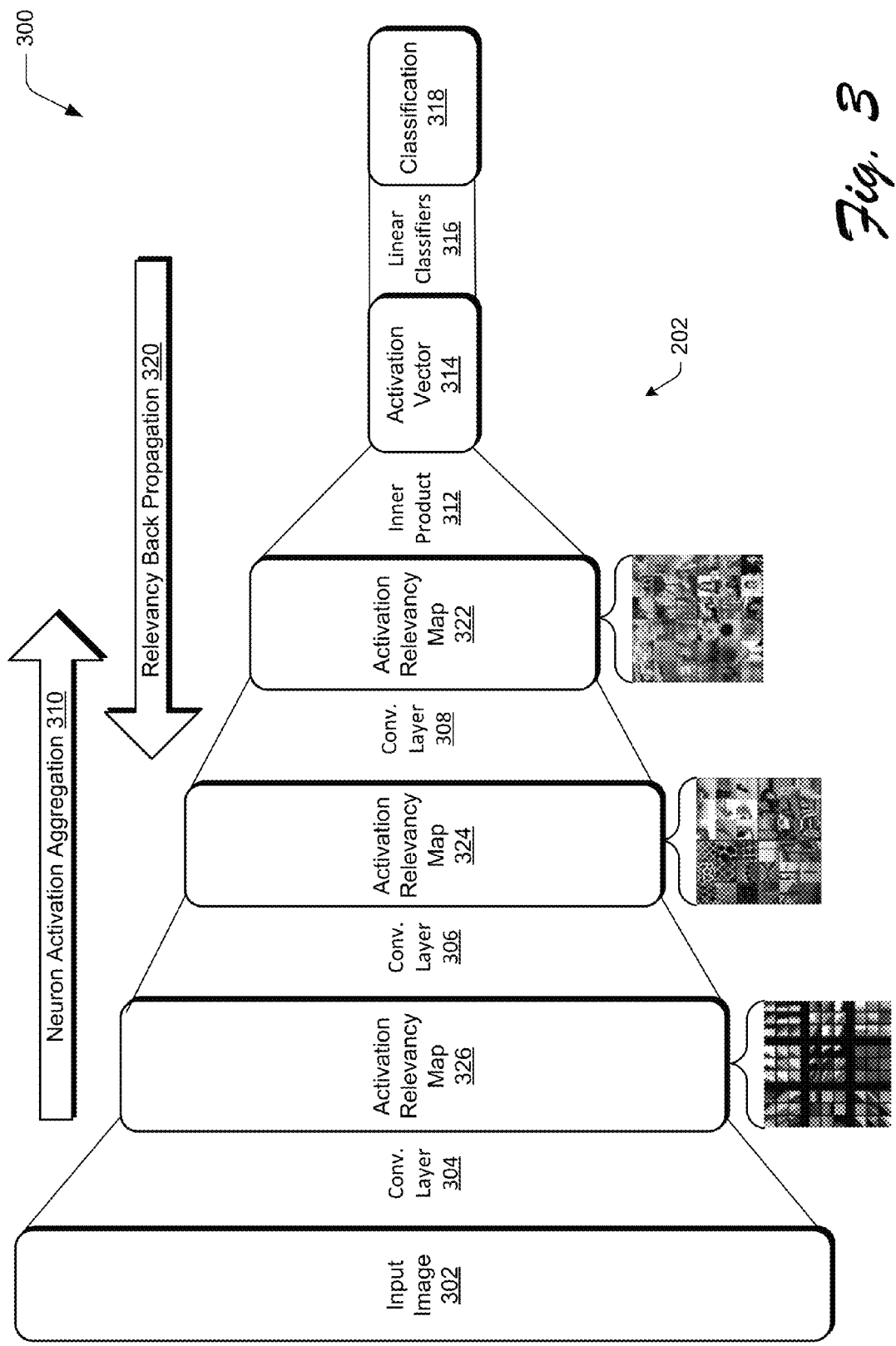
FIG. 3 depicts an example system showing a neural network of FIG. 2 in greater detail as performing activation aggregation and localization.

FIG. 3 depicts an example system 300 showing the neural network 202 of FIG. 2 in greater detail as performing pattern aggregation and localization. In this example, an input image 302 is processed through successive convolutional layers 304, 306, 308 in a sequence of neuron activation aggregation 310 through an inner product to produce an activation vector 314. The activation vector 314 is then processed using linear classifiers 316 to arrive at a classification 318 of the input image 302, e.g., a particular semantic class that is expressed by the input image 302. Through aggregation of patterns, neurons of the convolutional layers 304, 306, 308 correspond to ever increasing portions of the input image 302, which may be overlapping.

The neural network 202 is also configured to support communication of relevancy back propagation 320 to progress backwards through the sequence used to aggregate activations. This is performed through the use of activation relevancy maps 322, 324, 326 that describe relevancy of the neurons to the semantic class. By progressing backwards through the sequence, this relevancy may be further refined to increasingly smaller portions of the input image 302 and thus serve to localize relevant portions within the input image 302 to identification of the semantic class. In this way, neurons that are considered relevant to the semantic class may be used to localize the semantic class within the input image 302 through definition of spatial information of the neurons and relevancy of those neurons to the semantic class. In other words, the particular outcome (e.g., the semantic class) is communicated (i.e., back propagated) through the neural network to localize how that outcome was obtained. Accordingly, this technique is applicable to any outcome that may be determined using a neural network 202 to determine which neurons and information relating to those neurons (e.g., portions of a picture) are used to achieve that outcome, such as to identify objects, emotions, and so forth.

Figure 4:
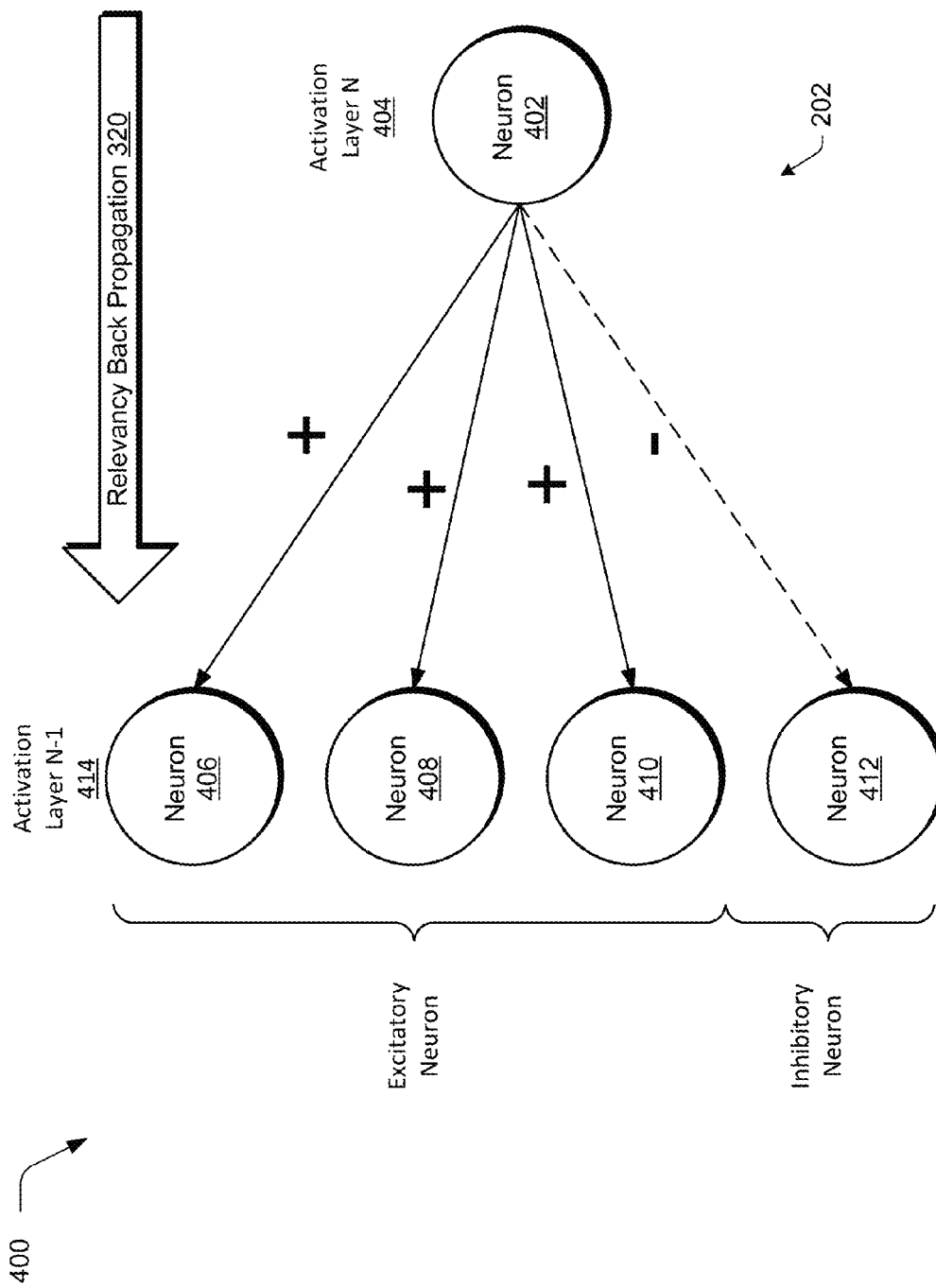
FIG. 4 depicts a system in an example implementation of activation relevance back propagation through neurons of the neural network of FIG. 3.

FIG. 4 depicts a system 400 in an example implementation of activation relevancy back propagation through neurons of the neural network of FIG. 3. In this example, a neuron 402 is illustrated as included in activation layer "N" 404. This neuron 402 has a plurality of neurons 406, 408, 410, 412 that are arranged as children in a previous activation layer "N−1" 414 of the neural network 202. In other words, neurons 406, 408, 410, 412 have a "many-to-one" relationship with neuron 402 to aggregate patterns of activations and a "one-to-many" relationship to back propagate relevancies.

Probabilistic WTA formulation is implemented in the following through use of a backpropagation scheme referred to as excitation backpropagation. Excitation backpropagation integrates both top-down (e.g., relevancy) and bottom-up (e.g., activation) information and computes the winning probability of each neuron in an efficient layer-wise manner in order to localize a semantic class within that layer. Accordingly, excitation backpropagation defines how relevancy is propagated backwards through the neural network. In this approach, positive relevancy defines a condition is which the activation of a neuron of the neural network is relevant to a particular semantic class, i.e., is excitatory. Negative relevancy, on the other hand, defines a condition in which the activation of a neuron of the neural network is not relevant, i.e., is inhibitory.

As illustrated, connections between neuron 402 and neurons 406, 408, 410 in a previous layer of the neural network are excitatory, whereas a connection between neuron 412 and neuron 402 is inhibitory. Because relevance is probabilistic in this example and thus described how much an activation neuron excites relevant neurons in the following layer, positive relevancy is propagated in this example and negative relevancy is not as negative relevancy is not informative for localization purposes.

An activation relevancy map is then formed that describes relevancy of respective portions of the image to the semantic class. The formation of the map is based on the amount of relevancy that is computed for each of the neurons in a layer, which thus defines an amount of relevancy for respective portions of the image 302. Therefore, activation relevancy maps having increased amounts of resolution may be generated by progressing backward through the layers of the neural network 202.

Relevancy back propagation 320 supports use of top-down attention as a probabilistic Winner Take All (WTA) and thus supports increased richness over conventional deterministic WTA processes that are limited to generation of binary attention maps. Expressed mathematically, given a selected output unit (i.e., a semantic class), a probabilistic WTA formulation is used to model a neural network's top-down relevancy, which is also referred to as attention in the following. The probabilistic WTA approach generates activation relevancy maps that are configured to capture subtle differences between top-down signals.

In the following formulation, a top-down signal used for relevancy back propagation 320 is specified by a prior distribution "$P(A_0)$" over the output units, which model the uncertainty in the top-down control process. In practice, the L1-normalized output score vector or a user specified indicator vector (after L1-normalization) are used as "$P(A_0)$." Then, the "winning" neurons are recursively sampled in a top-down fashion based on a conditional winning probability "$P(A_t|A_{t-1})$," where "$A_t$," "$A_{t-1} \in \mathcal{N}$" denote the selected winner neuron at the current and the previous step respectively, and "$\mathcal{N}$" is the overall neuron set.

The top-down relevancy of each neuron is formulated as its probability of being selected as a winner in this process. Formally, given a neuron "$a_i \in \mathcal{N}$" (note that "$a_i$" denotes a specific neuron and "$A_t$" denotes a variable over the neurons), a Marginal Winning Probability (MWP) $P(a_i)$ is computed. The MWP "$P(a_i)$" can be factorized as follows:

$$P(a_i) = \sum_{a_j \in \mathcal{P}_i} P(a_i \mid a_j) p(a_j),$$

where "$\mathcal{P}_i$" is the parent node set of "$a_i$" (in top-down order as shown in FIG. 4 for relevancy back propagation 320). As indicated in the above equation, given "$P(a_i|a_j)$," "$P(a_i)$" is a function of the marginal winning probability of the parent nodes in the preceding layers. It follows that "$P(a_i)$" can be computed in a top-down layer-wise fashion through the neural network 202.

This formulation is equivalent to an absorbing Markov chain process with "$p_{ij}:=P(a_i|a_j)$" as the transition probability and neurons at the network bottom as the absorbing nodes. "$P(a_i)$" can then be interpreted as the expected number of visits when a walker randomly starts from a node in the output layer according to "$P(A_0)$." This expected number of visits can be computed by a simple matrix multiplication using the fundamental matrix of the absorbing Markov chain. Accordingly, the MWP "$P(a_i)$" is a linear function of the top-down signal "$P(A_0)$" as further described below.

In the following, an excitation backpropagation technique is described as part of the probabilistic WTA formulation in a neural network, such as a convolution neural network 202 as shown in FIG. 3. Convolution neural networks 202 are typically formed using a basic type of neuron "$a_j$," whose response is computed by "$\hat{a}_j = \phi(\Sigma_i w_{ij} \hat{a}_i + b_i)$." Here "$w_{ij}$" is the weight, "$\hat{a}_i$" is the input, "$b_i$" is the bias and "$\phi$" is the nonlinear activation function. This type of neuron is referred to as an activation neuron as previously described in relation to FIG. 4.

The following assumptions are employed about the activation neurons in the following:
A1. The response of the activation neuron is non-negative.
A2. An activation neuron is tuned to detect certain visual features. Its response is positively correlated to its confidence of the detection.

A1 holds for a majority of the convolutional neural networks as these network typically adopt a Rectified Linear Unit (ReLU) as the activation function. A2 has been empirically verified by a variety of recent works. It is observed that neurons at lower layers detect simple features like edge and color while neurons at higher layers can detect complex features like objects and body parts as shown in FIG. 3.

Between activation neurons, a connection is "excitatory" if its weight is non-negative, and "inhibitory" otherwise as shown in FIG. 4. The excitation backpropagation technique passes top-down signals through excitatory connections between activation neurons. Formally, let "$C_j$" denote the child node set of "$a_1$" (in the top-down order). As shown in FIG. 4, for instance, neurons 406-412 are consider children of neuron 402. For each "$a_i \in C_j$," the conditional winning probability "$P(a_i|a_j)$" is defined as follows:

$$P(a_i \mid a_j) = \begin{cases} Z_j \hat{a}_i w_{ij} & \text{if } w_{ij} \geq 0, \\ 0 & \text{otherwise} \end{cases}.$$

in which "$Z_j = 1/\Sigma_{i:w_{ij} \geq 0} \hat{a}_i w_{ij}$" is a normalization factor such that "$\Sigma_{a_i \in C_j} P(a_i|a_j) = 1$." In a special case when "$\Sigma_{i:w_{ij} \geq 0} \hat{a}_i w_{ij} = 0$," "$Z_j$" is defined as "0." Note that the formulation of "$P(a_i|a_j)$" is valid due to the first assumption "A1," since "$\hat{a}_i$" is always non-negative.

The above equation assumes that if "$a_j$" is a "winning" neuron, the next winning neuron will be sampled among its child node set "$C_j$" based on a connection weight "$w_{ij}$" and the input neuron's response "$\hat{a}_i$." The weight "$w_{ij}$" captures the top-down feature expectancy, while "$\hat{a}_i$" represents the bottom-up feature strength, as postulated by the second assumption "A2" above. Due to the first assumption "A1," child neurons of "$a_j$" with negative connection weights always have an inhibitory effect on "$a_j$," and thus are excluded in the competition.

The previous equation is used to recursively propagate the top-down signal layer by layer, and attention maps are computed from intermediate convolutional layers of the neural network, e.g., convolutional layers 304, 306, 308. In one example, the sum is taken across channels to generate a marginal winning probability (MWP) map as the activation relevancy map, which is a two-dimensional probability histogram.

Figure 5:
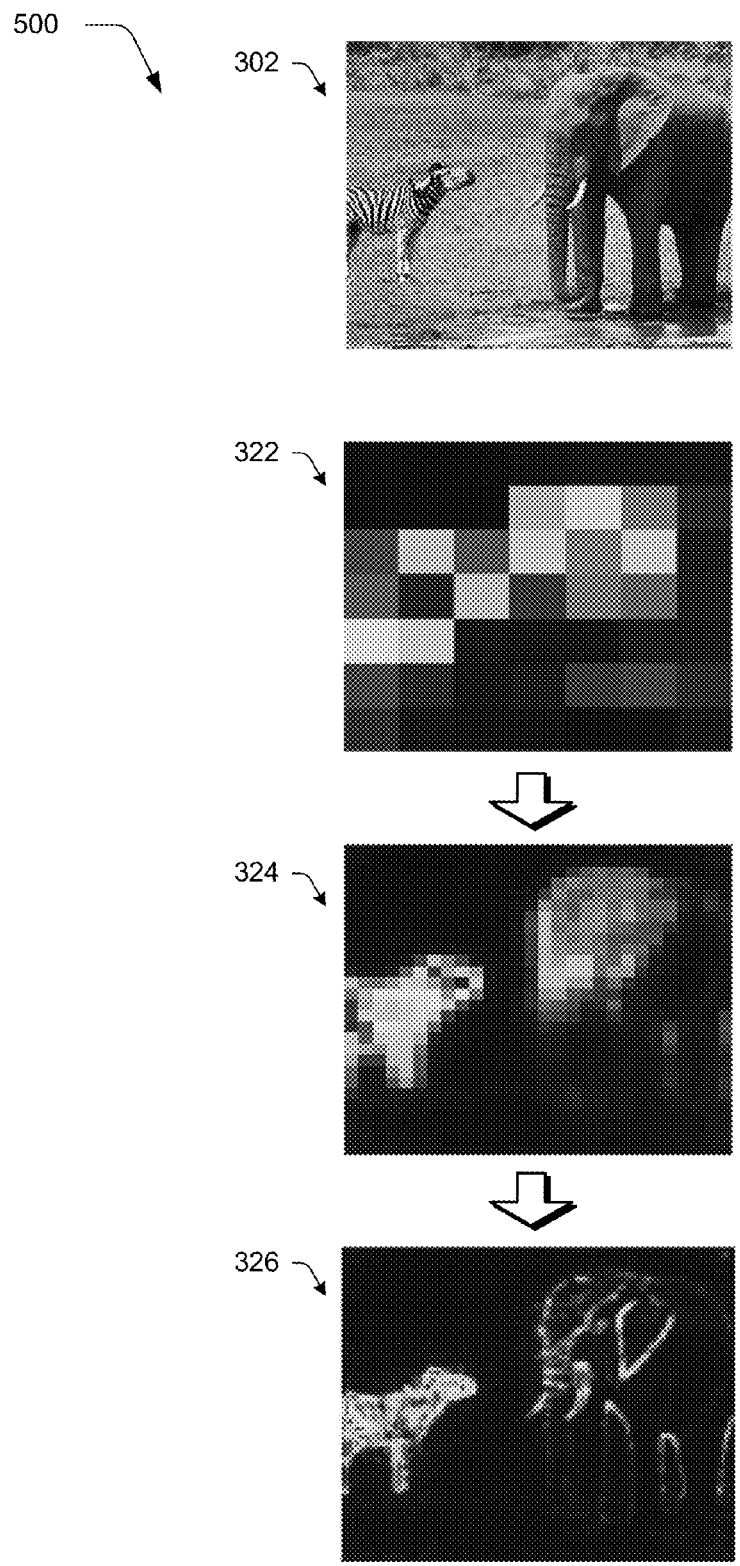
FIG. 5 depicts an example implementation showing activation relevancy maps generated for an input image for successive layers backwards through the neural network of FIG. 3.

FIG. 5 depicts an example implementation showing activation relevancy maps 322, 324, 326 generated for an input image 302 for successive layers backwards through the neural network 202. The input image 302 is provided as an example. Activation relevancy maps 322, 324, 326 describe portions of the image 302 at successively higher resolutions that are usable to identify semantic classes, e.g., a zebra and an elephant.

As illustrated, neurons at higher-level layers have larger receptive fields and strides. Thus, neurons at these higher layers capture larger areas but with lower spatial accuracy. Neurons at lower layers, on the other hand, tend to more precisely localize features of the semantic class at smaller scales.

As shown in activation relevancy map 326, for instance, the outlines of the ears, tusks, and part of the trunk have high relevancy in classification of the elephant whereas stripped portions of the head and torso have high relevancy in outlines of the zebra. As also illustrated, excitation backpropagation techniques may be used to generate activation relevancy maps (also referred to as attention maps) at any intermediate convolutional layer, and thus a complete backward propagation through the layers is not required. Instead, back propagation may be continued until a desired level of resolution in the activation relevancy maps is reached.

Figure 6:
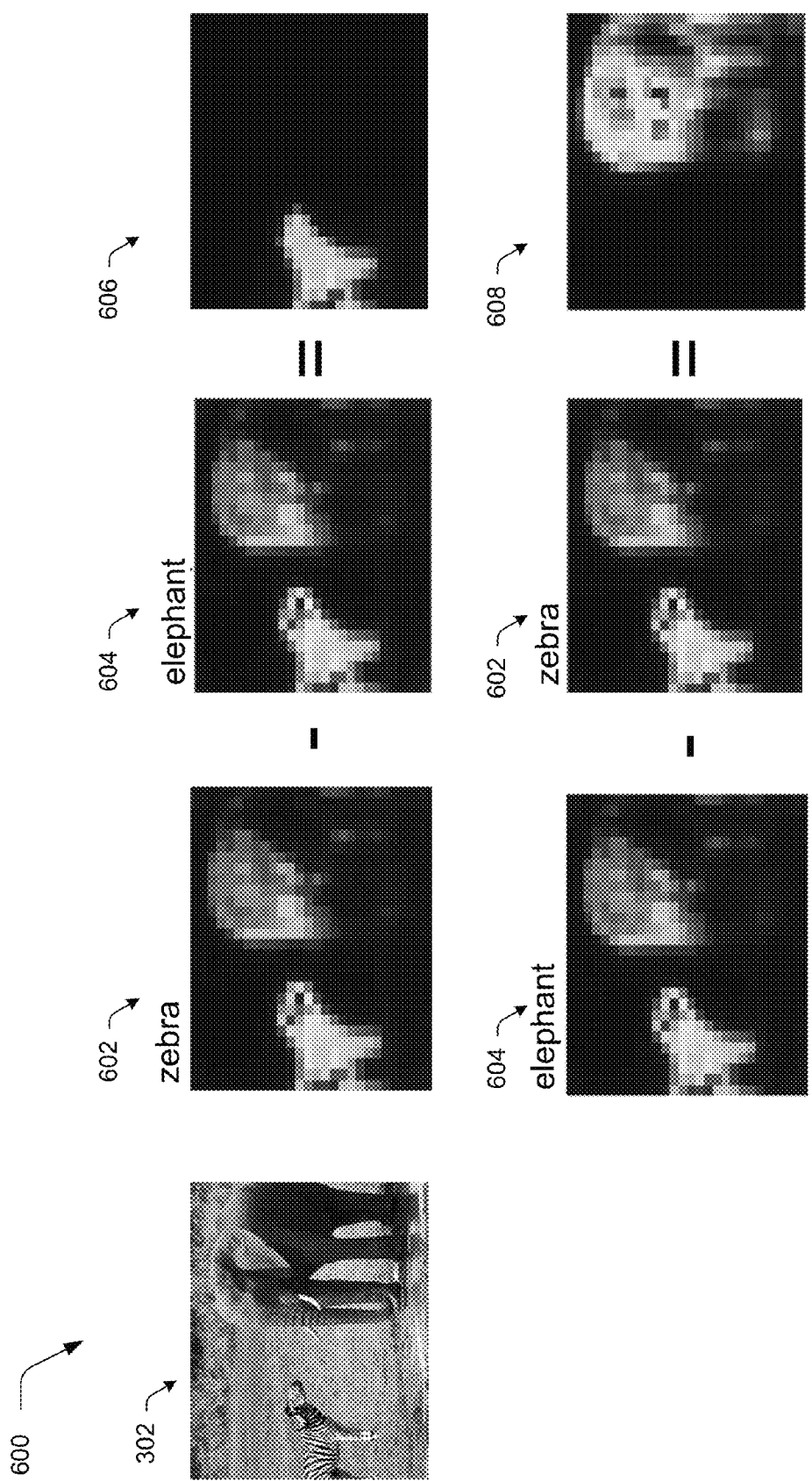
FIG. 6 depicts an example implementation of use of contrastive activation relevancy maps in order to localize different semantic classes within an image.

FIG. 6 depicts an example implementation 600 of use of contrastive activation relevancy maps in order to localize semantic classes within an image 302. Based on a probabilistic WTA formulation, contrastive top-down attention may be employed which captures a differential effect between a pair of contrastive top-down signals. The contrastive top-down attention can significantly improve accuracy of localization of semantic classes, especially for differentiation between a plurality of semantic classes within a single image 302, e.g., zebra and elephant.

As shown in a first example, an activation relevancy map 604 of an elephant may be subtracted from an activation relevancy map 602 for a zebra to achieve an activation relevancy map 606 for the zebra having increased accuracy. The contrary is also true, in which an activation relevancy map 602 of a zebra is subtracted from an activation relevancy map 604 for an elephant to achieve an activation relevancy map 408 for the elephant having increased accuracy. In this way, different semantic classes may be differentiated within an image.

Figure 7:
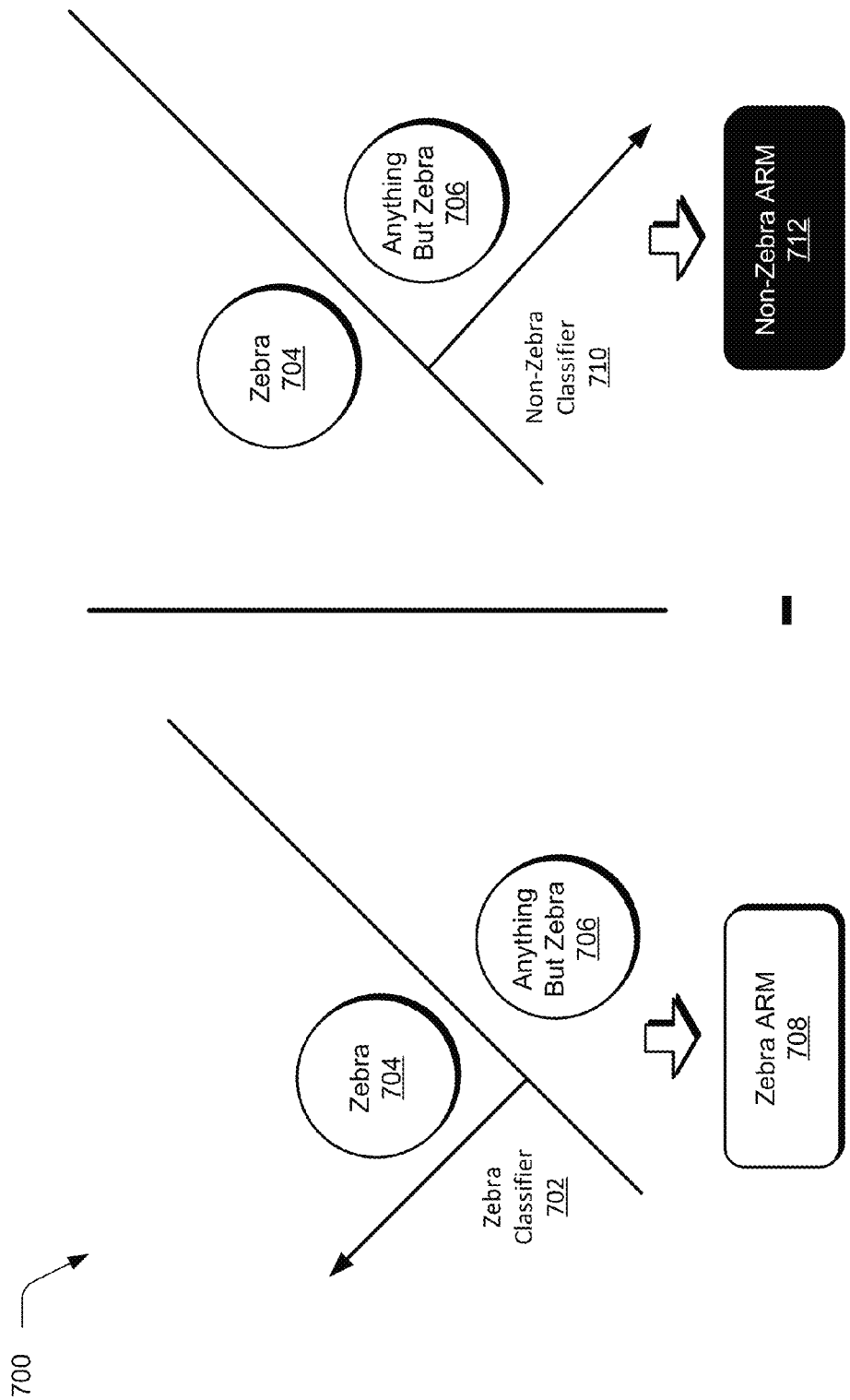
FIG. 7 depicts an example implementation of use of self-contrastive activation relevancy maps in order to localize a semantic class within an image.

FIG. 7 depicts an example implementation 700 of use of self-contrastive activation relevancy maps in order to localize a semantic class within an image. In this example, a zebra classifier 702 is employed as part of the neural network 202 of FIG. 2 to classify a zebra 704 from parts of the image (e.g., pixels or groups of pixels) that do not pertain to a zebra (i.e., anything but zebra 706) to form a zebra activation relevancy map 708.

A non-zebra classifier 710 is also employed to classify parts of the image that do not pertain to the zebra (e.g., anything but zebra) from parts of the image that do pertain to the zebra 704 in order to generate a non-zebra activation relevancy map 712. The non-zebra activation relevancy map 712 is then subtracted form the zebra activation relevancy map 708 to remove neurons that are common to both maps. In which way, accuracy of the zebra ARM 708 in localizing the semantic class "zebra" is increased by removing these neurons further discussion of which is described in the Implementation Example section in the following.

Expressed mathematically, MWP is a linear function of the top-down signal. Accordingly, any linear combination of MWP maps may be computed for an image by a single backward pass. To do so, top-down signal vectors at the top layer of the neural network 202 are linearly combined before performing excitation backpropagation. This property is used to generate highly discriminative top-down activation relevancy maps by passing down pairs of contrastive signals. For example, due to this linearity a plurality of semantic classes (e.g., concepts) may be localized as part of a single back propagation of MWP.

For each output unit "$o_i$," a dual unit "$\bar{o}_i$" is constructed having input weights that are the negation of those of "$o_i$." For example, if an output unit corresponds to a zebra classifier 702, then its dual unit will correspond to a non-zebra classifier 710. Subtracting the MWP map for non-zebra (i.e., non-zebra ARM 712) from the one for zebra (i.e., zebra ARM 708) causes common winner neurons in both maps to be cancelled out, thus amplifying the discriminative neurons for zebra. An activation relevancy map formed from this subtraction may be computed by a single backward pass, thus conserving processing resources. In one or more implementations, the target unit and its dual are weighted equally, and the resulting MWP map is configured such that only positive parts are kept. The probabilistic formulation described herein ensures that the resulting activation relevancy map formed as part of this contrastive technique includes positive relevancies unless the MWP map and its dual are identical.

FIGS. 8-11 depict examples 800, 900, 1000, 1100 of localization of semantic classes from captions associated with respective images. These examples demonstrate the localization ability of the techniques described herein. As is readily apparent, these techniques can localize only noun phrases and also actions verbs in the text.

Figure 8:
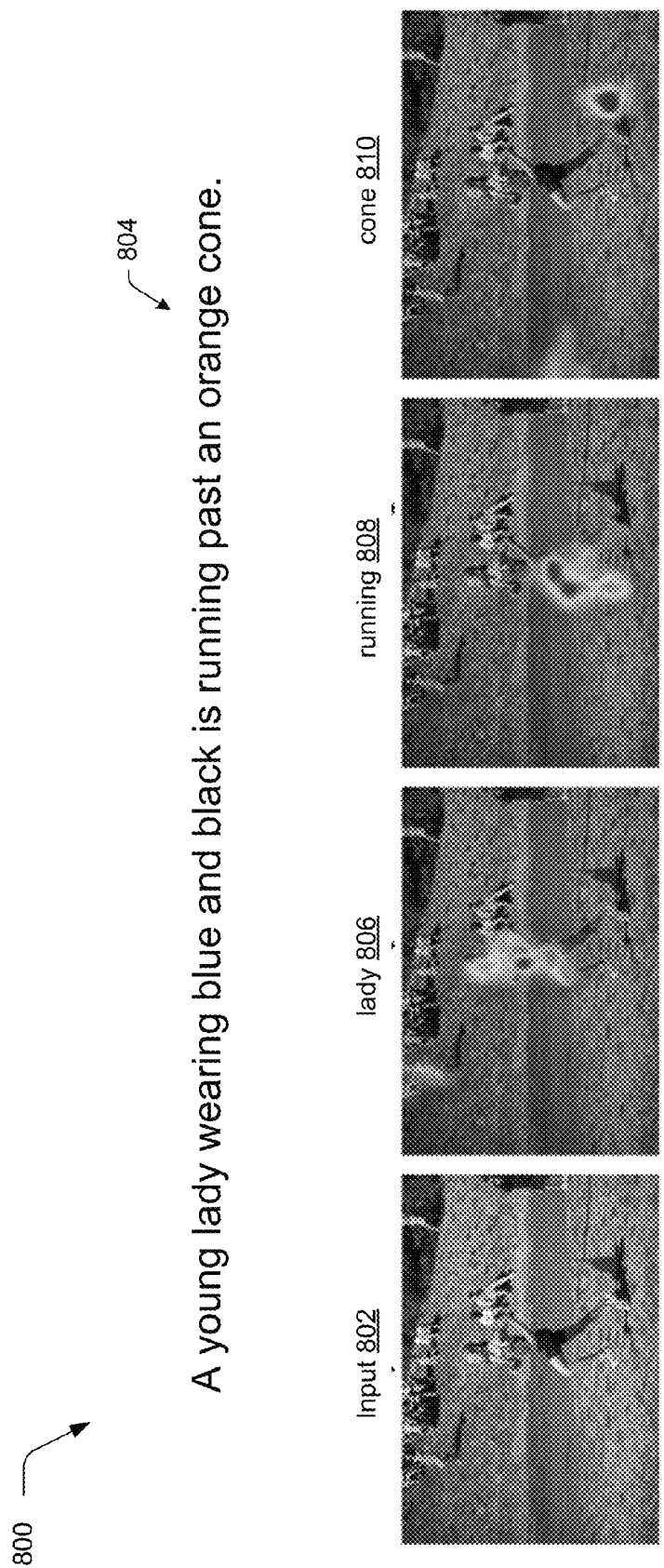
FIGS. 8-11 depict examples of localization of semantic classes from captions associated with respective images.

As shown in FIG. 8, for instance, an input image 802 is associated with a caption 804 of "A young lady wearing blue and black is running past an orange cone." From this, the image classification and localization system 122 localizes semantic classes of lady 806, running 808, and cone 810.

Figure 9:
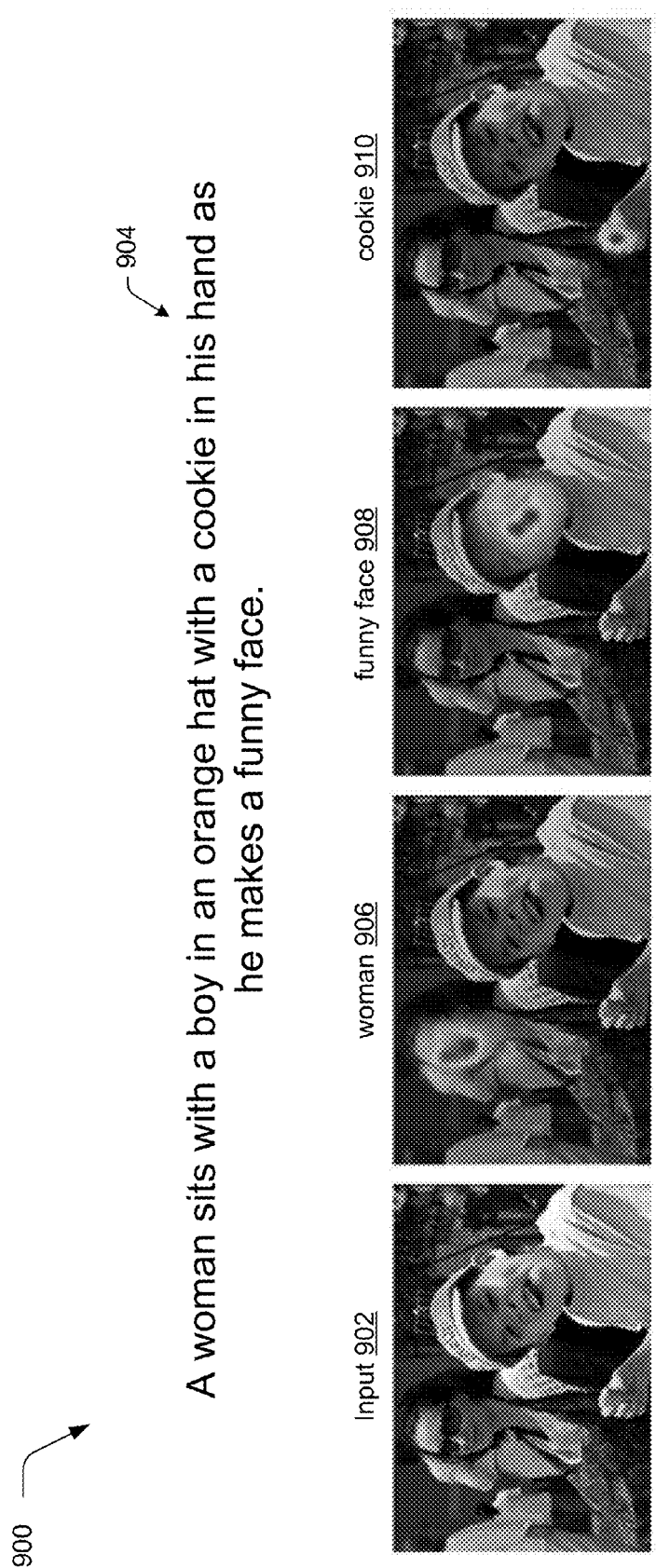

In FIG. 9, an input image 902 is associated with a caption 904 of "A woman sits with a boy in an orange hat with a cookie in his hand as he makes a funny face." From this, the image classification and localization system 122 localizes semantic classes of woman 906, funny face 908, and cookie 910.

Figure 10:
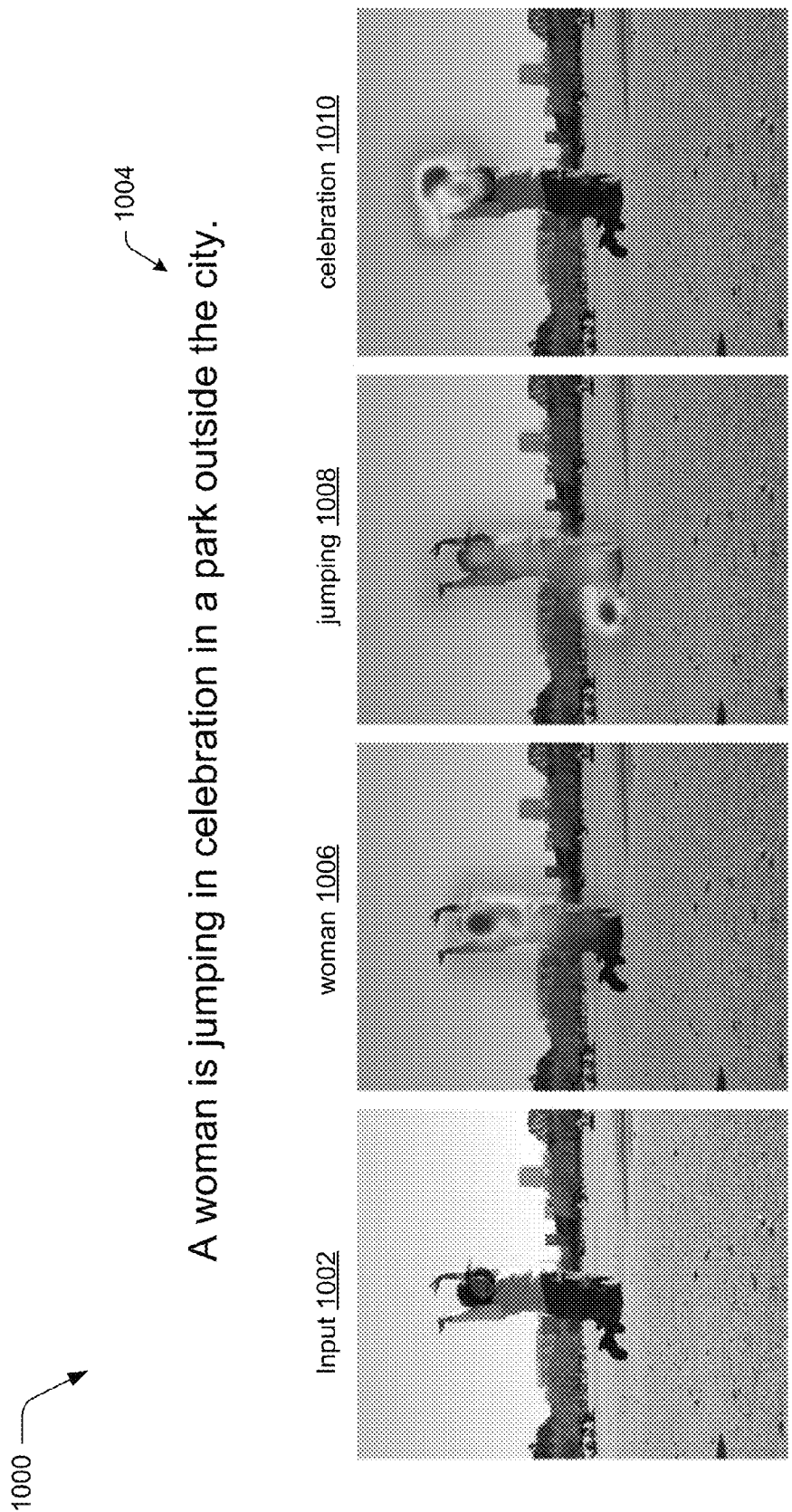

In FIG. 10, an input image 1002 is associated with a caption 1004 of "A woman is jumping in celebration in a park outside the city." From this, the image classification and localization system 122 localizes semantic classes of woman 1006, jumping 1008, and celebration 1010.

Figure 11:
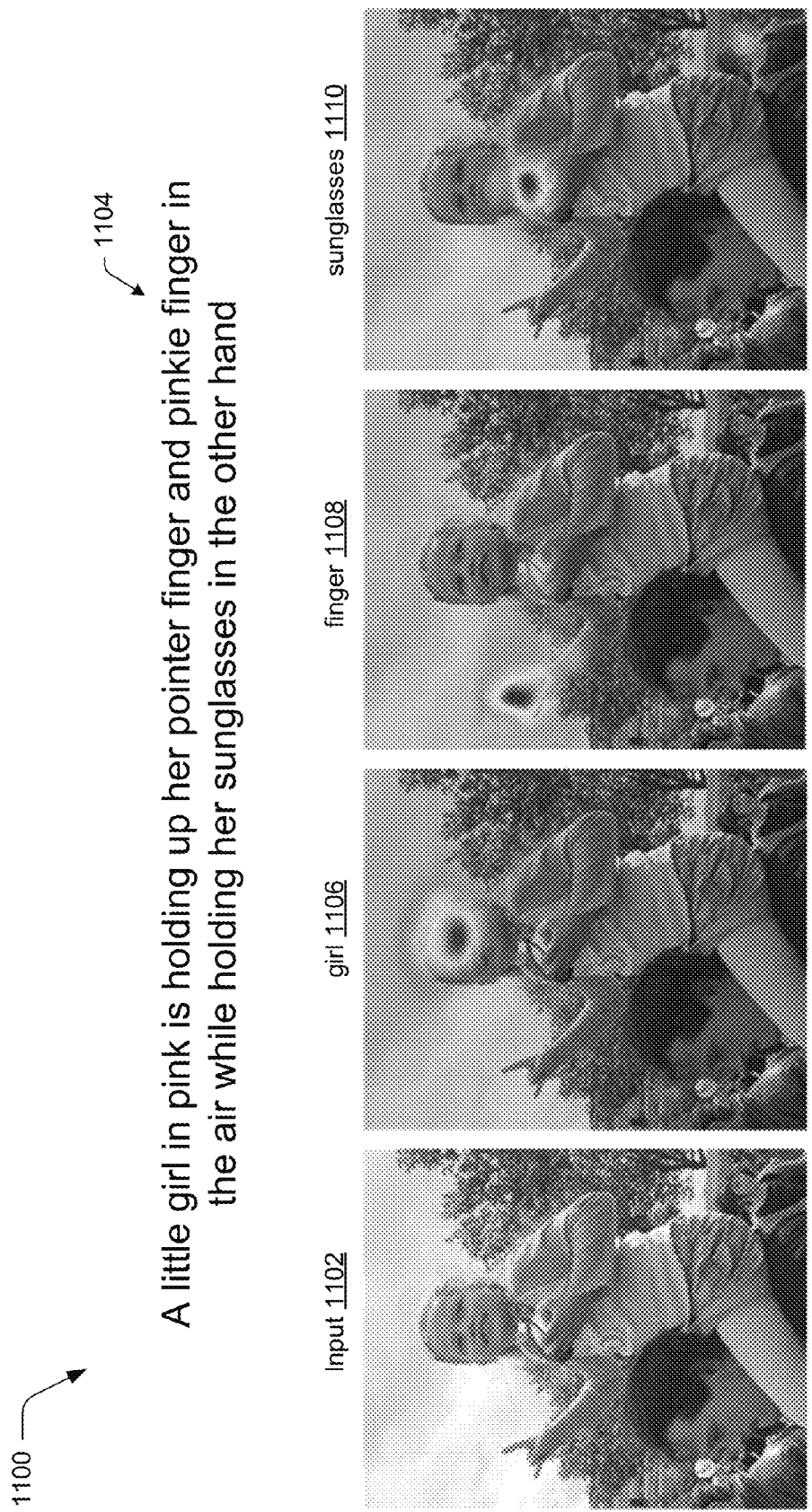

Likewise, in FIG. 11, an input image 1102 is associated with a caption 1104 of "A little girl in pink is holding up her pointer finger and pinkie finger in the air while holding her sunglasses in the other hand" From this, the image classification and localization system 122 localizes semantic classes of girl 1106, finger 1108, and sunglasses 1110. Thus, the techniques described herein are usable to localize a variety of semantic classes, further discussion of which is included in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

Figure 12:
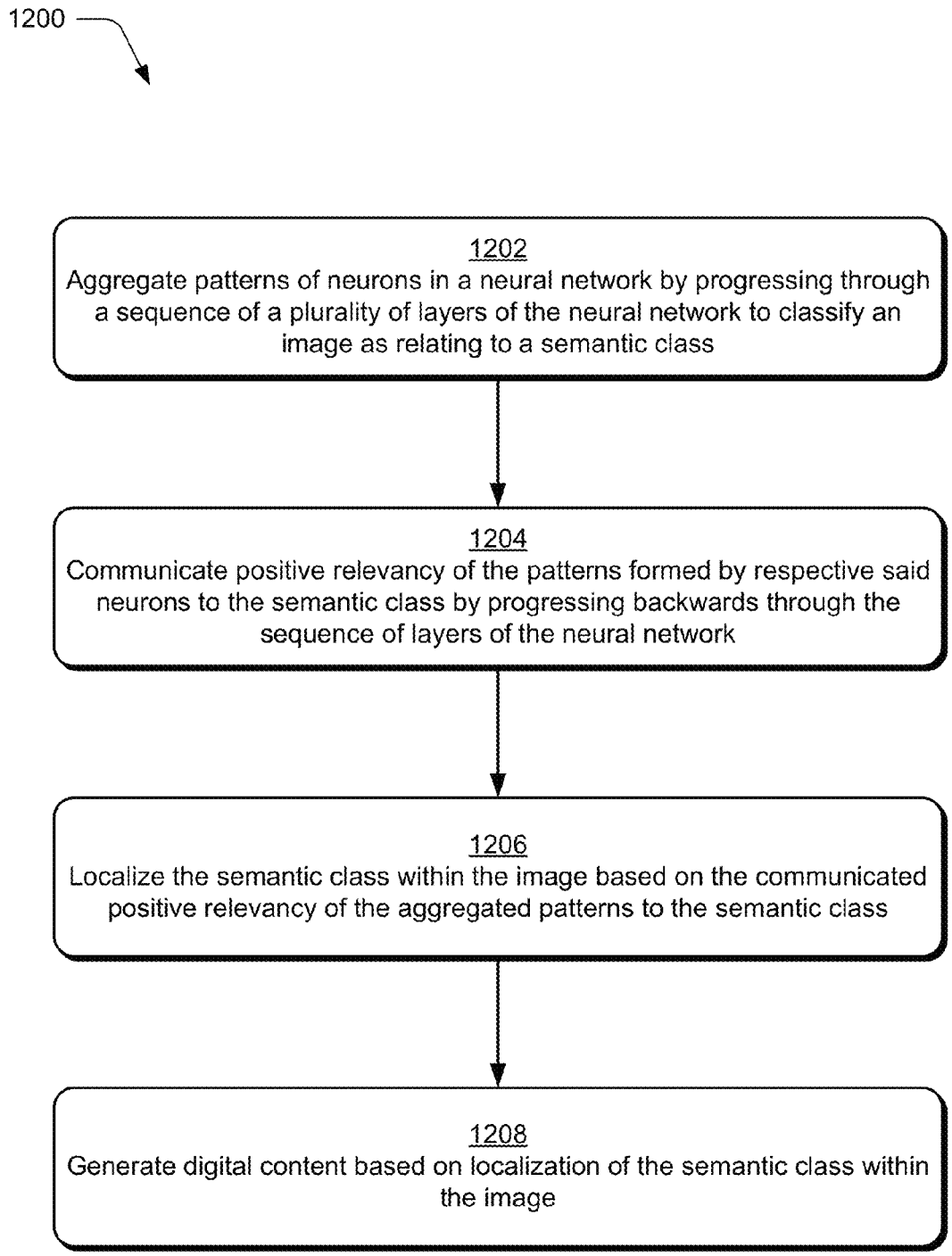
FIG. 12 is a flow diagram depicting a procedure in an example implementation in which a back propagation technique is used to propagate positive relevancy in a neural network to localize a semantic class within an image.

FIG. 12 depicts a procedure 1200 in an example implementation in which a communication technique is used to propagate positive relevancy in a neural network to localize a semantic class within an image. Activations are aggregated of neurons in a neural network by progressing through a sequence of a plurality of layers of the neural network to classify an image as relating to a semantic class (block 1202). The neural network 202, for instance, may be configured as a convolutional neural network that convolves the aggregations to arrive at the classification. This is performed in a sequence through the layers that aggregates the activations.

Positive relevancy is propagated of the activations of respective neurons to the semantic class defined using at least one activation relevance map by progressing backwards through the sequence of layers of the neural network (block 1204). As previously described, negative activations are not informative of localization. Accordingly, an excitation back propagation technique is employed as described in relation to FIG. 4 to back propagate positive relevance and thus improve efficiency and accuracy of the localization determination.

Digital content is generated based on localization of the semantic class within the image, the generating based at least in part on the aggregated activations and the positive relevancy of the activations of the respective said neurons (block 1206). The digital content, for instance, may include an index usable to find the image as part of an image search by leveraging location and the semantic class. Other examples are also contemplated as previously described.

Figure 13:
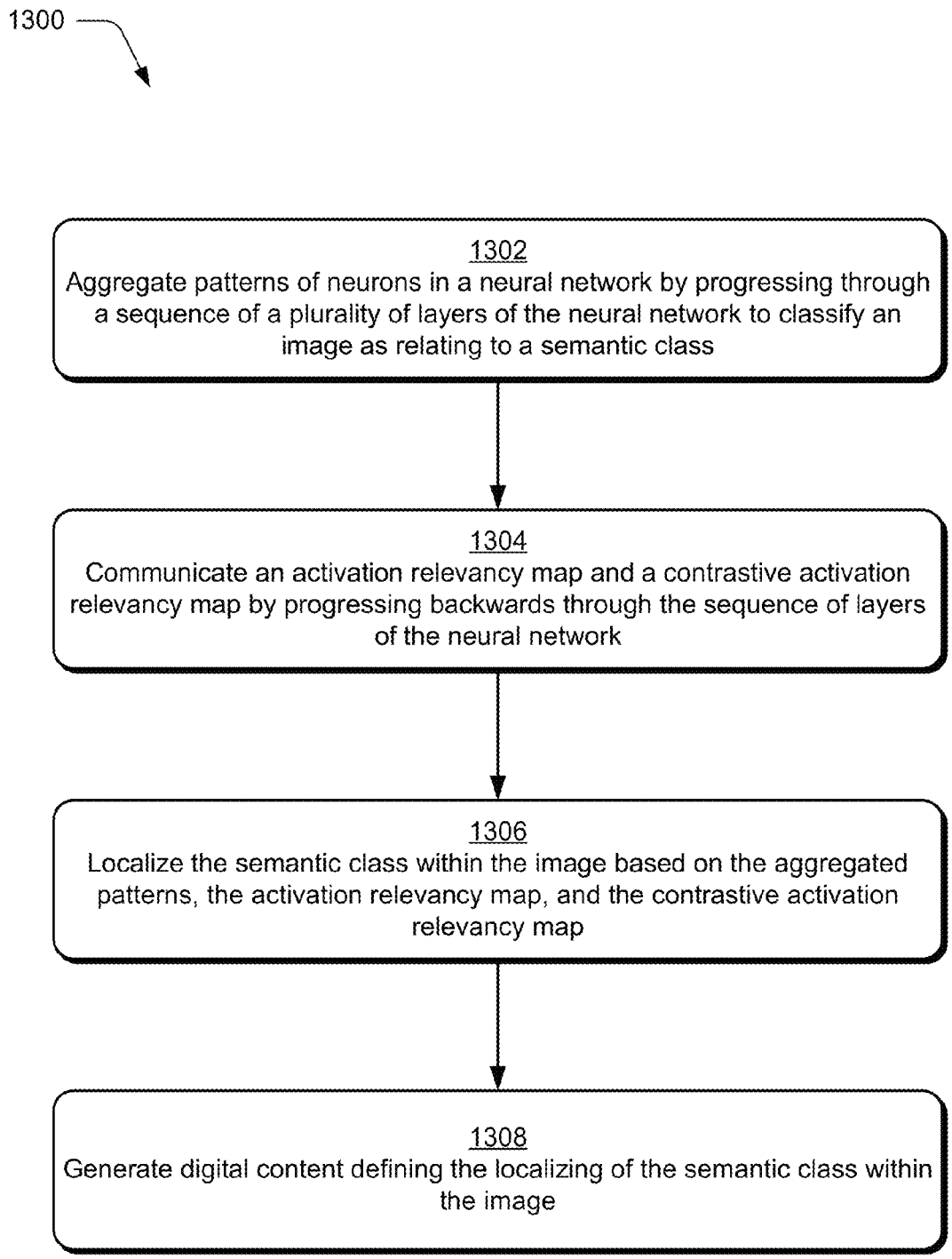
FIG. 13 is a flow diagram depicting a procedure in an example implementation in which a back propagation technique is used that employs an activation relevancy map and a contrastive activation relevancy map to localize a semantic class within an image.

FIG. 13 depicts a procedure 1300 in an example implementation in which a back propagation technique is used that employs an activation relevancy map and a contrastive activation relevancy map to localize a semantic class within an image. Activations are aggregated of neurons in a neural network by progressing through a sequence of a plurality of layers of the neural network to classify an image as relating to a semantic class (block 1302). Like before, the activations are aggregated in a sequence of neuron activation aggregation 310 through the neural network 202.

An activation relevancy map and a contrastive activation relevancy map are propagated by progressing backwards through the sequence of layers of the neural network (block 1304). The relevancy of these activations is further refined in a direction of relevancy back propagation 320 through the neural network 202.

Digital content is generated defining localization of the semantic class within the image, the generating based at least in part on the aggregated activations, the activation relevancy map, and the contrastive activation relevancy map (block 1306). As previously described, use of contrastive activation relevancy maps may be used to differentiate between different semantic classes as described in relation to FIG. 6 or self-contrastive to differentiate within the same semantic class as described in relation to FIG. 7. A variety of other examples are also contemplated as previously described.

Example System and Device

Figure 14:
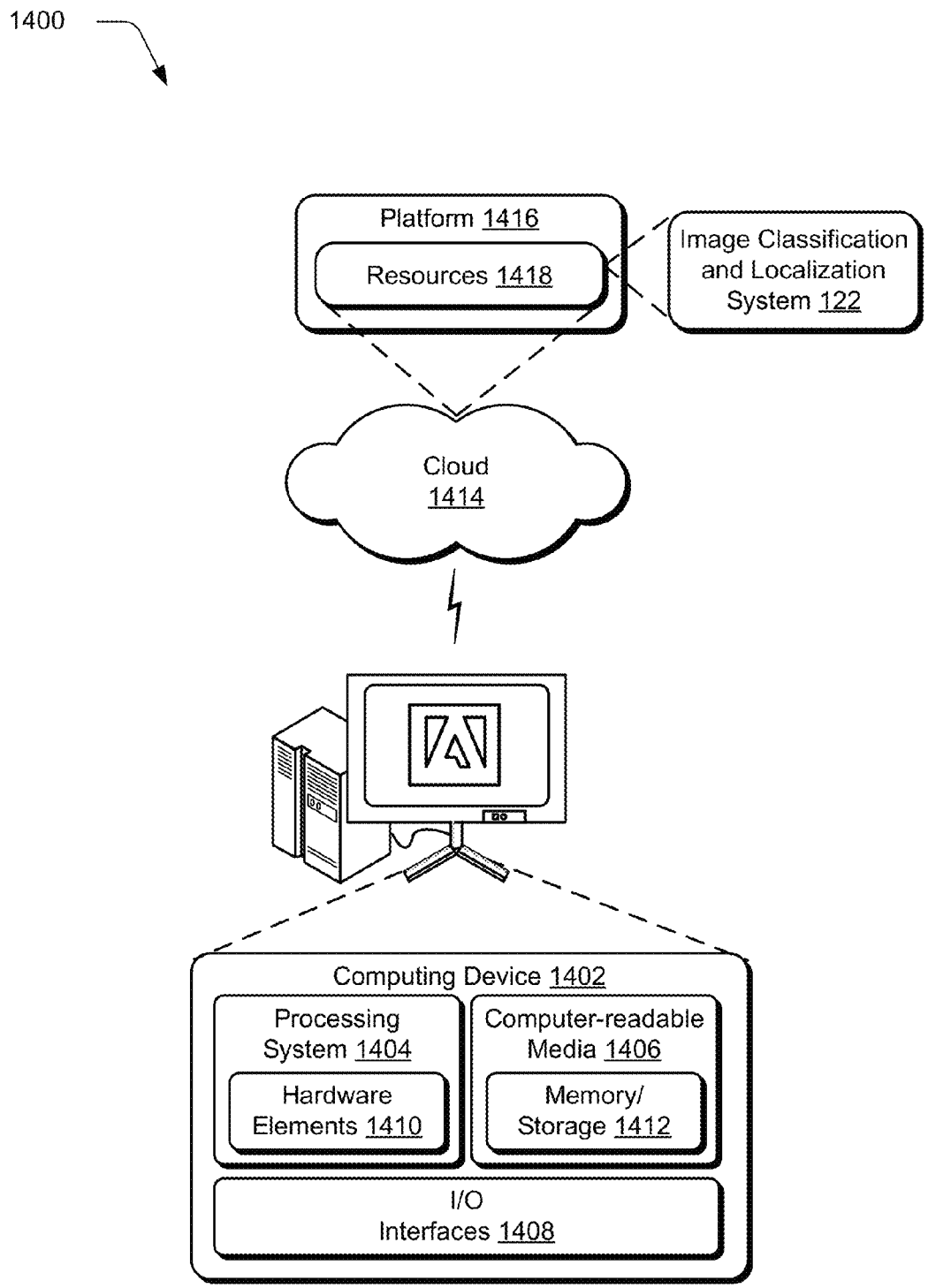
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the image classification and localization system 122. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium classification environment, a method implemented by at least one computing device, the method comprising:
   aggregating, by the at least one computing device, patterns of neurons in a neural network by progressing through a sequence of layers of the neural network to classify an image as relating to a semantic class;
   communicating, by the at least one computing device, positive relevancy of the patterns formed by the neurons to the semantic class by progressing backwards through the sequence of layers of the neural network, wherein the communicating of the positive relevancy of the pattern between a plurality of layers from the sequence of layers is based on a probabilistic Winner-Take-All (WTA) approach;
   localizing, by the at least one computing device, the semantic class within the image based on the communicated positive relevancy of the aggregated patterns to the semantic class; and
   generating, by the at least one computing device, digital content based on localization of the semantic class within the image.

2. The method as described in claim 1, wherein the semantic class identifies an object included in the image or emotional feeling expressed in the image.

3. The method as described in claim 1, wherein the communicating of the positive relevancy from one said neuron in a first said layer through connections to a plurality of said neurons in a second said layer is based on whether respective said connections between respective said neurons are:
   excitatory as pertaining to the aggregated pattern of the semantic class; or
   inhibitory as not pertaining to the aggregated pattern of the semantic class.

4. The method as described in claim 1, wherein the positive relevancy of the patterns to the semantic class is defined using an activation relevancy map of the image.

5. The method as described in claim 4, wherein the activation relevancy map describes a winning probability of connections between the neurons in different said layers as relating to positive relevancy to the semantic class.

6. The method as described in claim 4, wherein:
   the communicating including communicating a contrastive activation relevancy map that is self-contrastive as describing a lack of relevancy of respective said neurons in a respective said layer to the semantic class; and
   the localizing is based at least in part on the aggregated patterns, the activation relevancy map, and the contrastive activation relevancy map.

7. The method as described in claim 6, wherein the localizing includes removing portions of the aggregated patterns in the activation relevancy map that are in common with corresponding said neurons of patterns in the contrastive activation relevancy map that describe the lack of relevancy of the respective said neurons in the respective said layer.

8. The method as described in claim 1, wherein:
   the positive relevancy of the patterns to the semantic class is defined using an activation relevancy map of the image;

the communicating includes communicating a contrastive activation relevancy map that describes relevancy of aggregated patterns of the neurons to another semantic class; and the localizing is based at least in part on the aggregated patterns, the activation relevancy map, and the contrastive activation relevancy map.

9. The method as described in claim 1, wherein the communicating of the positive relevancy through the sequence of layers is performed as a single operation.

10. The method as described in claim 1, wherein the communicating of the positive relevancy preserves a sum of values of the positive relevancy between the sequence of layers.

11. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, an activation relevancy map and a contrastive activation relevancy map by progressing backwards through the sequence of layers of the neural network, wherein the activation relevancy map describes relevancy of the activations of the neurons in a layer to the semantic class and the contrastive activation relevancy map is self-contrastive as describing a lack of relevancy of the activations of the neurons in a layer to the semantic class;

localizing, by the at least one computing device, the semantic class within the image based on the aggregated patterns, the activation relevancy map, and the contrastive activation relevancy map, wherein the localizing includes cancelling relevancy of said neurons of the activation relevancy map that are in common with said neurons of the contrastive activation relevancy map; and generating, by the at least one computing device, digital content defining the localizing of the semantic class within the image.

12. The method as described in claim 11, wherein the relevancy is communicated from one said neuron in a first said layer through connections to a plurality of said neurons in a second said layer is based on whether respective said connections between respective said neurons are:

excitatory as pertaining to the aggregated pattern of the semantic class; or inhibitory as not pertaining to the aggregated pattern of the semantic class.

13. In a digital medium environment supportive of image search, a system comprising:

a neural network implemented at least partially using processing hardware, the neural network having a plurality of layers;

an aggregation module implemented at least partially using processing hardware to cause the neural network to aggregate patterns of neurons by progressing through a sequence of layers, the patterns classifying an image as relating to a semantic class;

a back propagation module implemented at least partially using processing hardware to cause the neural network to communicate relevancy of the patterns of the neurons as a positive and not negative relevancy to the semantic class by progressing backwards through the sequence of layers;

a digital content generation module implemented at least partially using processing hardware to generate digital content that localizes the semantic class within the image based at least in part on the aggregated patterns of neurons and the relevancy of the patterns of the neurons to the semantic class; and an image search module implemented at least partially using processing hardware to perform a search using a plurality of items of said digital content to locate respective said images as corresponding to text of a search query.

14. The system as described in claim 13, wherein the back propagation module is configured to communicate the relevancy from one said neuron in a first said layer through connections to a plurality of said neurons in a second said layer based on whether respective said connections between respective said neurons are:

excitatory as pertaining to the aggregated pattern of the semantic class; or inhibitory as not pertaining to the aggregated pattern of the semantic class.

15. The system as described in claim 13, wherein the positive relevancy of the patterns between respective said layers of the neural network is based on a probabilistic Winner-Take-All (WTA) approach.

16. The system as described in claim 13, wherein the positive relevancy of the patterns to the semantic class is defined using an activation relevancy map of the image.

17. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, positive relevancy of the patterns formed by respective said neurons to the semantic class by progressing backwards through the sequence of layers of the neural network, wherein the positive relevancy of the patterns to the semantic class is defined using an activation relevancy map of the image, wherein the communicating including communicating a contrastive activation relevancy map that is self-contrastive as describing a lack of relevancy of respective said neurons in a respective said layer to the semantic class;

localizing, by the at least one computing device, the semantic class within the image based on the communicated positive relevancy of the aggregated patterns to the semantic class, wherein the localizing is based at least in part on the aggregated patterns, the activation relevancy map, and the contrastive activation relevancy map; and generating, by the at least one computing device, digital content based on localization of the semantic class within the image.

18. The method as described in claim 17, wherein the localizing includes removing portions of the aggregated patterns in the activation relevancy map that are in common with corresponding said neurons of patterns in the contrastive activation relevancy map that describe the lack of relevancy of the respective said neurons in the respective said layer.

19. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, positive relevancy of the patterns formed by respective said neurons to the semantic class by progressing backwards through the sequence of layers of the neural network, wherein the positive relevancy of the patterns to the semantic class is defined using an activation relevancy map of the image, wherein communicating includes communicating a contrastive activation relevancy map that describes relevancy of aggregated patterns of the neurons to another semantic class;

localizing, by the at least one computing device, the semantic class within the image based on the communicated positive relevancy of the aggregated patterns to the semantic class, wherein the localizing is based at least in part on the aggregated patterns, the activation relevancy map, and the contrastive activation relevancy map; and generating, by the at least one computing device, digital content based on localization of the semantic class within the image.

20. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, positive relevancy of the patterns formed by respective said neurons to the semantic class by progressing backwards through the sequence of layers of the neural network, wherein the communicating of the positive relevancy through the plurality of layers is performed as a single operation;

localizing, by the at least one computing device, the semantic class within the image based on the communicated positive relevancy of the aggregated patterns to the semantic class; and generating, by the at least one computing device, digital content based on localization of the semantic class within the image.

21. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, positive relevancy of the patterns formed by respective said neurons to the semantic class by progressing backwards through the sequence of layers of the neural network, wherein the communicating of the positive relevancy preserves a sum of values of the positive relevancy between the plurality of layers;

localizing, by the at least one computing device, the semantic class within the image based on the communicated positive relevancy of the aggregated patterns to the semantic class; and generating, by the at least one computing device, digital content based on localization of the semantic class within the image.

22. In a digital medium classification environment, a method implemented by at least one computing device, the method comprising:

aggregating, by the at least one computing device, patterns of neurons in a neural network by progressing through a sequence of layers of the neural network to classify an image as relating to a semantic class;

communicating, by the at least one computing device, an activation relevancy map and a contrastive activation relevancy map by progressing backwards through the sequence of layers of the neural network, wherein:

the activation relevancy map describes relevancy of the activations of respective said neurons in a respective said layer to the semantic class; and the contrastive activation relevancy map describes relevancy of activations of respective said neurons in the respective said layer to another semantic class;

localizing, by the at least one computing device, the semantic class within the image based on the aggregated patterns, the activation relevancy map, and the contrastive activation relevancy map; and generating, by the at least one computing device, digital content defining the localizing of the semantic class within the image.

* * * * *